(12) United States Patent
Kishimoto et al.

(10) Patent No.: US 6,376,084 B1
(45) Date of Patent: Apr. 23, 2002

(54) GLASS-CERAMICS, PROCESS FOR PRODUCING THE SAME, AND SUBSTRATE FOR INFORMATION RECORDING MEDIUM, INFORMATION RECORDING MEDIUM AND INFORMATION RECORDING DEVICE EACH USING THE GLASS-CERAMICS

(75) Inventors: Shoichi Kishimoto; Akihiro Koyama; Hiroyuki Tanaka, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/513,166

(22) Filed: Feb. 25, 2000

(30) Foreign Application Priority Data

Feb. 25, 1999 (JP) ............................................ 11-049187
Nov. 9, 1999 (JP) ............................................ 11-318014

(51) Int. Cl.⁷ .......................... B32B 17/00; C03C 10/04
(52) U.S. Cl. ............................. 428/426; 501/5; 501/68; 501/69; 501/70; 501/72; 501/73
(58) Field of Search ........................... 428/426, 694 ST; 501/5, 68, 69, 70, 72, 73

(56) References Cited

U.S. PATENT DOCUMENTS

| | | | | |
|---|---|---|---|---|
| 2,920,971 | A | * | 1/1960 | Stookey |
| 4,219,344 | A | * | 8/1980 | Armistead et al. |
| 4,300,953 | A | * | 11/1981 | Lachman |
| 5,476,821 | A | | 12/1995 | Beall et al. |
| 5,491,116 | A | | 2/1996 | Beall et al. |
| 5,804,520 | A | * | 9/1998 | Mirinaga et al. |

FOREIGN PATENT DOCUMENTS

| | | |
|---|---|---|
| JP | 8-91873 | 4/1996 |
| JP | 10-188260 | 7/1998 |
| WO | 98/22405 | 5/1998 |

* cited by examiner

Primary Examiner—Deborah Jones
Assistant Examiner—Jennifer McNeil
(74) Attorney, Agent, or Firm—Sughrue Mion, PLLC

(57) ABSTRACT

A glass-ceramics having a high elastic modulus, processes for producing the same, and an information recording medium substrate effectively inhibited from bending or vibrating are disclosed. The glass-ceramics has a major crystalline phase which has a Mohs' hardness of 6 or higher and is constituted of crystals containing manganese (Mn).

10 Claims, No Drawings

GLASS-CERAMICS, PROCESS FOR PRODUCING THE SAME, AND SUBSTRATE FOR INFORMATION RECORDING MEDIUM, INFORMATION RECORDING MEDIUM AND INFORMATION RECORDING DEVICE EACH USING THE GLASS-CERAMICS

FIELD OF THE INVENTION

The present invention relates to glass-ceramics which has a high elastic modulus and is suitable for use as a substrate for information recording media, e.g., hard disks and opto-magnetic disks, as a substrate for electrical/electronic parts, and as an optical part or a substrate for optical parts, and a process for producing the same. The present invention further relates to a substrate for an information recording medium having high performances with small deflection, utilizing advantages of high elastic modulus and high heat resistance of the glass-ceramics.

BACKGROUND OF THE INVENTION

Glass-ceramics is generally produced by, for example, maintaining an amorphous glass as a precursor therefor at a temperature of from the glass transition point to about the softening point for a certain period of time. Glass-ceramics combine high surface flatness inherent in glasses, and high mechanical strength and heat resistance improved by crystallization, and has no pores or voids that are difficult to eliminate in conventional ceramics. A further feature of glass-ceramics is that properties such as coefficient of thermal expansion can suitably be regulated according to applications of the glasses.

Due to those properties, glass-ceramics has conventionally been used as heat-resistant tableware and building members and is recently used as substrates for electrical/electronic parts, as optical parts, as substrates for optical parts, or as substrates for information recording media. The term "information recording media" used herein means something in which information is retained in any form. Specifically, an information recording medium is something having a recording layer which partly changes magnetically, physically, chemically, or mechanically by the action of magnetism, light, heat, etc., and retains the changed state permanently or temporarily. Furthermore, the term "substrates for information recording media" used herein means, for example, substrates for magnetic disks, optomagnetic disks, compact disks (CD), and the like to be integrated into hard disks for use in computers, digital cameras, digital video recorders, etc. However, the substrates for information recording media should not be construed as being limited to those.

Substrates for information recording media (hereinafter referred to as "substrates" for simplicity) are always required to attain higher information recording density and higher rate of recording or reading. In particular, with the recent trend toward the recording or processing of information as digital data, the above requirements are becoming highly important. In order to realize a substrate of higher information recording density, flatter surface of the substrate must be obtained. In hard disks, for example, higher recording density can be obtained by narrower distance between the magnetic head and the substrate (lower glide height) employed. However, if surface flatness of the substrate was low, lower glide height causes a serious problem that the magnetic head comes into contact with projections exist on the substrate surface and is thus damaged. On the other hand, in order to realize a substrate available on higher rate of information recording or readout, mechanical strength (elastic modulus) of the substrate must be improved. In hard disks, for example, a higher rate of recording or readout can be obtained by employing higher rotational speed of the substrate. However, higher substrate rotational speed results in larger substrate bending and a larger amplitude of substrate vibration, and this leads to a strong fear that the magnetic head hits on the substrate and the head, films on substrate, and information recorded are damaged.

Hitherto, substrates made of an aluminum alloy have generally been used for hard disks. Although such substrates made of an aluminum alloy (hereinafter referred to as "aluminum substrates") have merits of inexpensive, good formability, etc., they have drawbacks, for example, that the elastic modulus thereof is insufficient and there is no way to improve the elastic modulus thereof, and the surface flatness thereof cannot be improved beyond a certain level. An elastic modulus (Young's modulus) of these aluminum substrates is 71 GPa, and it is thought that aluminum substrates are inapplicable to hard disks which are driven at a rotational speed of 10,000 rpm or higher and expected to become the mainstream in the future, due to the low elastic modulus thereof. This is because when rotated at such a high speed, the aluminum substrates bend more and vibrate at larger amplitude to cause a problem therefore the glide height cannot be lowered. In addition, since further size reduction will be required to various information recording devices including hard disks in the future, thinner substrates will also be required. However, aluminum substrates cannot meet the above requirement because a thickness reduction therein results in larger bending.

Substrates made of a glass-ceramics (hereinafter referred to as "crystallized substrates") are superior to aluminum substrates in flatness and elastic modulus. Despite this, however, conventional crystallized substrates have become unable to meet the recent requirements concerning higher recording densities and higher rates of recording or reading sufficiently. Under these circumstances, crystallized substrates of higher elastic modulus have been proposed. For example, JP-A-8-91873 (the term "JP-A" as used herein means an "unexamined published Japanese patent application") discloses a glass-ceramics of major crystalline phase containing nickel spinelloid (solid solution of $NiAl_2O_4$ and $Ni_2SiO_4$). U.S. Pat. Nos. 5,476,821 and 5,491,116 and International Publication WO 98/22405 describe a devised technique in which the composition of a glass-ceramics is changed to improve the elastic modulus.

Further, JP-A-10-188260 discloses a technique of improving the flatness of a glass-ceramics containing lithium disilicate ($Li_2O.2SiO_2$) as a major crystalline phase and cristobalite ($SiO_2$) crystals coexistent therewith by adding manganese (MnO) and chromium ($Cr_2O_3$) to the glass in an amount of from 1 to 3 wt %.

However, the prior art techniques have the following problems.

The glass-ceramics disclosed in JP-A-8-91873 contains nickel oxide (NiO) in a large amount. Since nickel is an expensive element, this glass-ceramics is expensive and unsuitable for mass production.

The glass-ceramics described in U.S. Pat. Nos. 5,476,821 and 5,491,116 and International Publication WO 98/22405 has a drawback that devitrification occurs during glass forming even if the glass is not cooled rapidly. Consequently, this prior art glass has high devitrification temperature and is hence difficult to mass-produce in a stable manner. Another drawback of this glass-ceramics is that it is difficult to examine the glass-ceramics for defects such as surface mars and adherent foreign substances because the glass-ceramics is milk-white or hazy.

Further, the glass-ceramics disclosed in JP-A-10-188260 has a drawback that its elastic modulus (Young's modulus) is low because the major crystalline phase thereof comprises lithium disilicate ($Li_2O.2SiO_2$).

SUMMARY OF THE INVENTION

The present invention has been achieved in view of the above-described problems of the prior art techniques.

One object of the present invention is to provide a glass-ceramics which has a high elastic modulus, can be produced easily, and is inexpensive.

Another object of the present invention is to provide a process for producing the glass-ceramics.

Still another object of the present invention is to provide at low cost a crystallized substrate which can effectively suppress bending or vibrating.

Further object of the present invention is to provide an information recording medium.

Still further object of the present invention is to provide an information recording device.

The glass-ceramics according to the present invention has a major crystalline phase constituted of crystals containing manganese (Mn).

The process for producing the glass-ceramics according to the present invention comprises utilizing as a raw material a grinding or polishing waste which come from grounding or polishing process of the glass-ceramics or a precursor glass.

Another process for producing the glass-ceramics according to the present invention comprises holding a precursor glass at a certain temperature for a certain period of time (first-stage heat treatment) and then holding the precursor glass at a temperature higher than the first-stage heat treatment temperature for a certain period of time (second-stage heat treatment), wherein the first-stage heat treatment is conducted at a temperature higher than the glass transition temperature ($T_g$) of the precursor glass by from 25 to 100° C. for 30 minutes or longer, and the second-stage heat treatment is conducted at a temperature higher than the glass transition temperature ($T_g$) of the precursor glass by from 75 to 300° C. for 10 minutes or longer.

The substrate for an information recording medium according to the present invention comprises the glass-ceramics.

The information recording medium according to the present invention comprises using the crystallized substrate.

The information recording device according to the present invention contains the information recording medium.

DETAILED DESCRIPTION OF THE INVENTION

The practical embodiments of the present invention will be described in detail below. Hereinafter, all percents are by mol (mol %) and "elastic modulus" means the modulus represented by Young's modulus, unless otherwise indicated.

The present invention has been achieved as a result of intensive investigations on glass-ceramics with respect to compositions, heat treatment conditions, precipitated crystal systems, and elastic modulus. Specifically, it has been found that a glass-ceramics having major crystalline phases constituted of crystals containing manganese have an exceedingly high elastic modulus, and that this glass-ceramics can be produced from a precursor glass of lower liquidus temperature if various ingredients including $TiO_2$ are contained therein in appropriate contents. The present invention has been completed based on those findings.

Because of its major crystalline phase containing manganese, the glass-ceramics has higher elastic modulus and can be produced at low cost. Manganese is an inexpensive element contained in minerals occurring in large quantities, such as huebnerite ($MnWO_4$), manganolangbeinite ($K_2Mn_2(SO_4)_3$), apjohnite ($MnAl_2(SO_4)_4.22H_2O$), and wad (black ocher, bog manganese, or earthy manganese). Consequently, both a high elastic modulus and inexpensiveness, which are effects of the present invention, are attained together by forming manganese-containing crystals so as to constitute major crystalline phases.

Manganese has been used conventionally as one of colorant for glasses, and manganese-containing glasses show brown to black color depending on the content thereof. Glass-ceramics obtained by crystallization of manganese-containing homogeneous glasses (precursor glasses) also have light blown to black color. It is therefore easy to examine these glass-ceramics for surface defects, e.g., mars and foreign substances.

The term "major crystalline phases" as used herein means the crystalline phase of the highest amount among all the crystals simultaneously precipitated through crystallization of precursor glass. The amount of crystalline phases precipitated can be determined by either of the following methods or by other methods:

(1) a method in which the glass-ceramics is examined with an optical or electron microscope or the like and the proportion of each crystalline phase in terms of vol % is calculated from the area thereof; and (2) a method in which the glass-ceramics is analyzed with an X-ray diffractometer to obtain an X-ray powder diffraction pattern and the proportion of each crystalline phase is calculated from the intensity at the corresponding diffraction peak appearing in the curve.

Although the term "major crystalline phases" means a certain crystalline phase present in a largest proportion scientifically, two or more crystalline phases may precipitate in nearly the same amount and it may be hard to tell which one is the major phase. According to the above definition, however, the extension of the present invention is clear even in such cases.

The glass-ceramics of the present invention is a colored composition with high elastic modulus, therefore applications thereof are not particularly limited as long as the properties thereof are effectively utilized. For example, when the glass-ceramics is used as optical parts or substrates for optical parts, there are advantages, for example, that the deformation caused by an external force can be reduced due to its high elastic modulus and that stray light can be effectively suppressed without performing any special treatment due to its color. The glass-ceramics can also be used as high-modulus ceramics fibers for use as a reinforcing member or in composite materials, ceramics tiles as external wall materials for buildings, or highly light-shielding bottles for chemicals, so as to take advantage of the above effects. Since thermal expansion coefficients of the glass-ceramics can be controlled in a wide range, it is utilizable also in optical devices as a member for compensating of deviations caused by temperature changes. In particular, from the standpoint of utilizing its high elastic modulus, the glass-ceramics is suitable for use as a crystallized substrate. This crystallized substrate bends less even when it is spun at a high speed, enables a lower flying height of heads, and contributes to increase recording density and recording/reading rate in information recording devices.

The manganese-containing crystals constituting the major crystalline phases preferably contain at least one element selected from the group consisting of aluminum (Al), silicon (Si) and titanium (Ti), and the major crystalline phase in this case preferably has a Mohs' hardness of 6 or higher. When the crystals containing at least one of these elements constitute the major crystalline phases, the glass-ceramics has a higher elastic modulus. Examples of such crystalline phases include galaxite ($MnAl_2O_4$; Mohs' hardness: 8), spessartite ($Mn_3Al_2Si_3O_{12}$; Mohs' hardness: 7), rhodonite ($MnSiO_3$; Mohs' hardness: 6.5), tephroite ($Mn_2SiO_4$; Mohs' hardness: 6), pyroxmangite ($MnSiO_3$; Mohs' hardness: 6), pyrophanite ($MnTiO_3$; Mohs' hardness: 6), and manganese cordierite ($Mn_2Al_4Si_5O_{18}$; Mohs' hardness: 7). It is preferred that one or more of these crystalline phases constitute the major crystalline phase. Since the elastic modulus shows how hard to deform by a uniaxial external stress, it is considered that the more harder crystals are contained, the higher the elastic modulus of the glass-ceramics is. As a result of intensive experiments based on this hypothesis, it has been found that a glass-ceramics containing a precipitated crystalline phase having a Mohs' hardness of 6 or higher has an elastic modulus of 110 GPa or higher.

The manganese-containing crystals may contain metallic elements or ions other than those enumerated above for the purposes of, e.g., obtaining further high elastic modulus, further fine grains of precipitated crystal and precursor glasses of further easy to produce. Examples of such ingredients include magnesium (Mg), zinc (Zn), zirconium (Zr), cerium (Ce), and ions of these. Where the crystals contain magnesium (Mg) or ions thereof, not only the glass-ceramics has a further high elastic modulus and the precursor glass and the glass-ceramics are more homogenized, but also elastic modulus of remained vitreous parts of glass-ceramics is higher than those without containing Mg. Where the crystals contain zinc (Zn) or ions thereof, the precursor glass and the glass-ceramics have a higher degree of homogeneity. Where the crystals contain zirconium (Zr) or ions thereof, not only fine crystal nuclei generate in a large amount, resulting in a dense crystalline phase, but also elastic modulus of remained vitreous parts of glass-ceramics is higher than those without containing Zr. Where the crystals contain cerium (Ce) or ions thereof, elastic modulus of remained vitreous parts of glass-ceramics is higher than those without containing Ce.

Manganese (Mn) is an essential ingredient for forming the major crystalline phase. The Mn content in the glass-ceramics is preferably from 8 to 55% in terms of MnO. If the Mn content is lower than 8%, temperature to melt the batch becomes unacceptably high, and it is difficult to produce a homogeneous precursor glass, and this leads to maldistribution of crystals in glass-ceramics. In addition, the major crystalline phase is less apt to be constituted by crystals without containing manganese and, as a result, elastic modulus of the glass-ceramics becomes lower and the color thereof becomes lighter which brings difficulty in examining the surface defects. The term "batch" as used herein means a mixture of raw glass materials which has been prepared so that each ingredient is contained in a proper content. On the other hand, if the content of manganese exceeds 55%, liquidus temperature of the melt becomes so high that it is difficult to produce a homogeneous precursor glass, and it is hard to obtain a glass-ceramics in which crystals are uniformly distributed. In order to avoid these problems effectively, the content of manganese is preferably from 9 to 50%, more preferably from 9 to 40%, most preferably from 16 to 40%. Where the content of MnO is lower than 16%, the glass-ceramics preferably contains at least 1% MnO because elastic modulus tends to become lower in the glass-ceramics containing such a low MnO content.

$SiO_2$ is an essential ingredient because it is the network former in glass structure and can constitute the framework of crystalline phase. Lower and upper limits of $SiO_2$ content are determined from the viewpoint whether a homogeneous precursor glass can be formed and whether manganese-containing crystals constitute a major crystalline phase or not, respectively. Specifically, the content of $SiO_2$ in the glass-ceramics is preferably from 30 to 75%, more preferably from 33 to 60%, most preferably from 33 to 55%. If the content of $SiO_2$ is lower than 30%, liquidus temperature of the melt becomes unacceptably high and viscosity of the melt is an exceedingly low, therefore the melt devitrifies quickly and it is difficult to form a homogeneous precursor glass. On the other hand, if the content of $SiO_2$ exceeds 75%, viscosity of the melt is an exceedingly high besides the problem of high liquidus temperature, it is difficult to obtain a homogeneous precursor glass. In addition, such too high $SiO_2$ contents result in tridymite ($SiO_2$) or mullite ($Al_6Si_4O_{13}$) precipitation as the major crystalline phase, and lower elastic modulus in resultant glass-ceramics.

$Al_2O_3$ is an ingredient which constitutes a precursor glass and a crystalline phase. The content of $Al_2O_3$ is preferably from 4 to 33%, more preferably from 4 to 27%, most preferably from 5 to 15%. If the content of $Al_2O_3$ is lower than 4%, liquidus temperature of the melt becomes so high that it is difficult to form a homogeneous precursor glass and a glass-ceramics of fine grain. On the other hand, if the content of $Al_2O_3$ exceeds 33%, part of the $Al_2O_3$ remains unmelted in melting process, so it is difficult to form a homogenous precursor glass. Besides the problem of quick rising of liquidus temperature, there also is a problem that the precursor glass containing such too much $Al_2O_3$ gives mullite ($Al_6Si_4O_{13}$) precipitation as the major crystalline phase and low elastic modulus in resultant glass-ceramics.

MgO is not only very effective to homogenize the precursor glass and the glass-ceramics but also quite a good ingredient to improve the elastic modulus. However, too much MgO content gives rise to undesirable high liquidus temperature of the precursor glass. MgO is hence an optional ingredient. The content of MgO is determined by trade-off between the improvement in elastic modulus and the impairment in liquidus temperature, hence it is preferably from 0 to 20%, more preferably from 0 to 10%. When the content of MnO is lower than 16%, at least 1% of MgO is preferably contained in the glass-ceramics to keep its high elastic modulus of glass-ceramics. When the glass-ceramics contains MgO, MgO can be contained in the major crystalline phase. In this case, elastic modulus of the glass-ceramics becomes higher than that without containing MgO.

ZnO, which is an optional ingredient, is effective to homogenize the precursor glass and the glass-ceramics. The content of ZnO is preferably from 0 to 20%, more preferably from 0 to 12%, most preferably from 0 to 10%. If the content of ZnO exceeds 20%, there is a strong fear of devitrification of the precursor glass. When the major crystalline phase contains ZnO, elastic modulus of the glass-ceramics is slightly decreased although this decrease is negligible.

The content of the bivalent metal oxides (RO=MnO+ MgO+ZnO) considerably influences the liquidus temperature of the precursor glass and the elastic modulus of the glass-ceramics. If the content of RO is lower than 25%, elastic modulus of the glass-ceramics is evidently decreased. On the other hand, if the content of RO exceeds 50%, liquidus temperature of the precursor glass is undesirably high, that is, the molten glass tends to be devitrified during cooling/solidification and homogeneous precursor glass is unavailable. Consequently, the content of RO is preferably from 25 to 50%.

$TiO_2$, although an optional ingredient, is not only very effective to homogenize the precursor glass and the glass-ceramics but also quite a good nucleating agent to obtain fine crystals. When incorporated in crystals, $TiO_2$ greatly improves the elastic modulus of the glass-ceramics. Even if some $TiO_2$ is not contained in the precipitated crystals, it improves the elastic modulus of the parts other than the crystals. Consequently, $TiO_2$ should be incorporated into the glass-ceramics of present invention rather than the addition of the other optional ingredients. It is well known that milk-white or opaque glasses contains relatively large amount of $TiO_2$, $TiO_2$ has the side-effect of making the glass milk-white or opaque. Consequently, the content of $TiO_2$ is preferably from 0 to 20%, more preferably from 0.5 to 15%, most preferably from 4 to 15%. If the content of $TiO_2$ exceeds 20%, liquidus temperature of the precursor glass becomes unacceptably high and easier to devitrify and easier to become milk-white.

$ZrO_2$, which is an optional ingredient, is an ingredient well known as a nucleating agent useful for the formation of crystal nuclei. $ZrO_2$ is also effective to improve the elastic modulus of those parts other than crystals in the glass-ceramics. However, if an excessively large amount of $ZrO_2$ is contained in the precursor glass, there is strong possibility of causing unnecessary crystallization (devitrification). The excess addition of $ZrO_2$ is not only harmful to the devitrification resistance of the precursor glass, but also a cause of milk-white glass due to phase separation. Consequently, the content of $ZrO_2$ is preferably from 0 to 10%, more preferably from 0 to 5%, and most preferably from 0.5 to 5%.

$CeO_2$, which is an optional ingredient, serves to improve the elastic modulus of those parts other than crystals in the glass-ceramics. It is well known that $CeO_2$ is also used as a major component of general abrasive materials. The content of $CeO_2$ in the glass-ceramics is preferably 5% or lower, and more preferably from 0 to 3%. If the content of $CeO_2$ exceeds 5%, liquidus temperature of the precursor glass becomes undesirably high and easier to devitrify.

For the purposes of refining during melting, regulating the viscosity of the molten glass, regulating the liquidus temperature, etc., ingredients other than the major ingredients described above can further be added. (Hereinafter, such optional ingredients are referred to as "minor ingredients".) Examples of the minor ingredients include $As_2O_3$, $Sb_2O_3$, $SO_3$, $SnO_2$, $Fe_2O_3$, CoO, Cl, F, $R_2O$ (R is Li, Na, K or Cs) and R'O (R' is Ca, Sr or Ba). Of those minor ingredients, $Li_2O$ and $Na_2O$ are preferred because they are effective to slightly lower the liquidus temperature, and $K_2O$ is preferred because it is effective to increase the viscosity of the molten glass. The upper limit of the content of the minor ingredients is 5%. If the content of minor ingredients exceeds the upper limit, the glass is very easy to devitrify. Besides being purposely added, such minor ingredients, in some cases, come into the glass as impurities of raw materials for major ingredients. The content of the minor ingredients in the glass-ceramics is preferably 8% or lower, more preferably 5% or lower. If the content of minor ingredients exceeds 8%, not only the minor ingredients exert a considerable influence on the contents of major ingredients, but also the glass-ceramics comes to show properties attributable to the minor ingredients. On the other hand, there often are cases where minor ingredients come into the glass in an amount of up to about 2% as impurities of raw materials for major ingredients.

The glass-ceramics in which the contents of the components are within the respective ranges specified above has an elastic modulus of 110 GPa or higher, and is produced from a precursor glass having a liquidus temperature of 1,260° C. or lower. The elastic modulus of this glass-ceramics is at least 150% of that of aluminum substrates, which is 71 GPa. As will be demonstrated in Examples given later, the elastic modulus of the glass-ceramics can be reached up to 120 GPa or higher, or can be reached up to 130 GPa or higher, by further regulating the composition within the above range. This glass-ceramics, therefore, is effectively utilizable in various applications where high-modulus characteristics are required. Furthermore, since the liquidus temperature of the precursor glass is 1,260° C. or lower or can be 1,100° C. or lower, this precursor glass can be produced by the float process which is a general process in industrial production of sheet glass. As long as the precursor glass has a liquidus temperature within that range, the temperature of the molten glass can easily be managed and the furnace can effectively be prevented from being thermally damaged.

The glass-ceramics has superior heat resistance, with the temperature at which the glass-ceramics cannot withstand its own weight (yield point) being 900° C. or higher. The glass-ceramics is hence kept away from problems such as deformation even in high-temperature processing. Consequently, if the glass-ceramics is used as a substrate, functional films of higher performances can easily be formed on a surface thereof. When the crystallized substrate is sufficiently heated in forming thereon such functional films, which usually are deposited by sputtering, then the surface texture of the substrate becomes finer to enable a higher density of information recording. The same effect is produced by sufficiently heating the crystallized substrate after the formation of functional films. Namely, the high heat resistance of the glass-ceramics enables an information recording medium to attain a higher information recording density.

Processes for producing the glass-ceramics are not particularly limited and conventional techniques can be used as they are. Examples thereof include the following two processes:

(1) a process comprising a one-stage heat treatment in which a precursor glass is held at a temperature higher than the glass transition temperature thereof by at least 20° C. for at least a certain period of time; and (2) a process comprising a two-stage heat treatment in which a precursor glass is held at a temperature around the glass transition temperature thereof for a certain period of time to generate crystal nuclei and then held at a higher temperature for a period of time sufficient to enable the nuclei to grow.

However, the following process facilitates the formation of a glass-ceramics of higher elastic modulus with a large amount of exceedingly fine crystals precipitated in thereof. This process is a two-sage heat treatment which comprises holding a precursor glass at a temperature higher than the glass transition temperature ($T_g$) thereof by from 25 to 100° C. for 30 minutes or more (first-stage heat treatment) and then keeping the precursor glass at a temperature higher than the $T_g$ by from 75 to 300° C. for 10 minutes or more (second-stage heat treatment). The first-stage heat treatment is a conventional step for generating crystal nuclei in the precursor glass. If the temperature for this treatment is below the temperature higher than the $T_g$ by 25° C. or if the maintaining time is shorter than 30 minutes, the generation of crystal nuclei is insufficient and, hence, precipitated crystalline phases during the second-stage heat treatment has less contribution to improvement of elastic modulus or precipitated crystals in the second-stage treatment become too large to obtain glass-ceramics of fine crystals. On the other hand, if the temperature for the first-stage treatment is higher than the $T_g$ by more than 100° C., there is a high possibility that the precursor glass may deform badly or melt during the first-stage heat treatment. As conventionally known, the second-stage heat treatment is a step for growing the crystal nuclei which have been generated in the precursor glass. However, if the temperature for this treatment is below the temperature higher than the $T_g$ by 75° C. or if the holding time is shorter than 10 minutes, the growth of crystals is insufficient and this results in lower elastic modulus in a glass-ceramics. If the temperature for the second-stage heat treatment is not higher than that for the first-stage heat treatment, this second-state treatment is meaningless. On the other hand, if the temperature for the second-stage heat treatment is higher than the $T_g$ by more than 300° C., there is a high possibility that precipitated crystalline phases have less contribution to improvement of elastic modulus or the precursor glass may deform badly or melt during the heat treatment.

The precursor glass and the glass-ceramics are processed appropriately according to applications. For example, where the precursor or glass-ceramics is processed into a substrate, a large amount of a polishing waste comes from the polishing process. This polishing waste is a mixture of the glass-ceramics or the precursor glass therefor with an abrasive material. When the main component of abrasive material is comprised $CeO_2$, the polishing waste can hence be a part of raw material for a precursor glass. Consequently, to use this polishing waste as a part of a batch produces new effects, i.e., effective utilization of resources by recycling and environmental protection by the reduction of the discharge amount of the polishing waste as an industrial waste. Although the abrasive material is not particularly limited in components thereof, it preferably comprises one or more of the major ingredients of the glass-ceramics from the standpoint of producing the above effects.

For processing the glass-ceramics into a substrate, conventional techniques can be used as they are. Because of its high elastic modulus, this crystallized substrate has excellent properties such that it is stiff to bend and easy to escape from resonant vibration even when it is thin. Furthermore, since the crystallized substrate itself has a dark color, defects present thereon such as, e.g., mars and foreign substances can be detected easily and precisely even when these defects are microscopic ones. In addition, when a surface of the crystallized substrate is processed by a laser beam, finer processing is possible because the substrate has a large coefficient of heat absorption. Therefore, an information recording device containing this crystallized substrate integrated thereinto can sufficiently meet the requirements concerning higher recording densities, higher recording/reading rates, and smaller thickness, which will become severer in the future.

The present invention will be explained in more detail below by reference to the following Examples and Comparative Examples. It should however be understood that the invention is not construed as being limited thereto.

EXAMPLE 1

Common raw materials for glass including silica, alumina, manganese dioxide, magnesium oxide, calcium carbonate, zinc oxide, titania, zirconia and cerium oxide were mixed together to prepare a batch so as to result in the composition shown in Table 1. In place of the manganese dioxide ($MnO_2$), dimanganese trioxide ($Mn_2O_3$) or manganese carbonate ($MnCO_3$) can be used. This batch was melted by heating at 1,550° C. in a platinum crucible and then maintained therein at that temperature for 4 hours. Thereafter, the molten glass was poured on an iron plate. The molten glass on the iron plate was cooled and solidified in ten-odd seconds. Immediately after the solidification, the glass was placed in an electric furnace set at 600° C. After 30 minutes, the electric furnace was turned off and the glass was annealed to room temperature. Thus, a precursor glass was obtained.

The liquidus temperature of this precursor glass was measured by the following method. In many cases, the liquidus temperature of a precursor glass is generally determined by filling a rectangular platinum tray with particles of the precursor glass, maintaining this tray in a temperature-gradient furnace for a certain period of time, and then examining the glass with an optical microscope; the highest temperature at which crystal precipitation has occurred in the glass is taken as the liquidus temperature. However, since the precursor glass according to the present invention has a brown to black color, it is difficult to use an optical means, such as an optical microscope or visual examination, for judging as to whether crystals have precipitated within the glass. Consequently, the liquidus temperature of the precursor glass obtained above was determined by a method comprising spreading particles of the precursor glass on a platinum tray, maintaining this tray in a temperature-gradient furnace for 1 hour, and then visually examining the glass to determine the lowest temperature at which the crystals had disappeared from the glass surface and were not observed thereon; this temperature was taken as the liquidus temperature. It is generally known that in the heat treatment of a glass, crystals are more apt to precipitate in surface parts than in inner parts, and that the surface parts have a higher crystal disappearance temperature than the inner parts. Although the liquidus temperature of the above-obtained precursor glass was found to be 1,090° C. as a result of the above measurement, it is therefore thought that a lower liquidus temperature is obtained when the conventional method is used for the measurement. Namely, the liquidus temperature of this precursor glass is thought to be almost equal to or lower than those of general commercial glasses.

Property Measurements for the Precursor Glass

The precursor glass was cut into 10×30×30 mm, and each side was subjected to mirror polishing to produce a platy sample. First, the density of the platy sample was measured by the Archimedes method. The platy sample was then examined with a sing-around oscillator to calculate the elastic modulus thereof by the ultrasonic pulse method (JIS R 1602-1986). Subsequently, a columnar sample having a diameter of 5 mm and a length of 15 mm was produced, and was examined with an ordinary thermomechanical analyzer to determine the glass transition point defined as the temperature at which the thermal expansion coefficient increases abruptly, the yield point defined as the temperature at which the columnar sample comes not to withstand its own weight and comes not to show vertical expansion, and the average coefficient of linear expansion in the range of from 50 to 350° C.

Crystallization Treatment

Subsequently, the precursor glass was maintained in an electric furnace set at 750° C. for 4 hours to generate sufficient crystal nuclei. The temperature inside the electric furnace was then elevated to 850° C. at a rate of 5° C./min and maintained at that temperature for 4 hours to grow the crystals sufficiently. Thereafter, the furnace was switched off to cool the specimen to room temperature.

In the above heat treatment, the precursor glass suffered no deformation. The glass-ceramics obtained was black. This glass-ceramics was sampled, and the sample was examined with an X-ray diffractometer to obtain an X-ray powder diffraction pattern. As a result, it was found that the major crystalline phase in the glass-ceramics was constituted of pyrophanite and rhodonite crystals each containing titanium in solid solution. It was further found that spessartite crystals containing titanium in solid solution coexisted with those crystals.

Property Measurements for the Glass-ceramics

Samples were prepared and examined in the same manners as in the "Property Measurements for the Precursor Glass" given above, provided that the temperature defined as glass transition point with respect to the precursor glass was referred to as expansion coefficient transition temperature because the specimen was not homogeneous glass.

As a result of the measurements, this glass-ceramics was found to have a density of 3.52 g·cm$^{-3}$, an elastic modulus (Young's modulus) of 130 GPa, and an expansion coefficient of 74×10$^{-7}$° C$^{-1}$. The transition temperature thereof at which the expansion coefficient changed abruptly was found to be 871° C., and the yield point thereof at which the specimen was deformed by its own weight was found to be 900° C. or higher (higher than the determination limit for the apparatus). These results show that the glass-ceramics obtained above had excellent heat resistance. Furthermore, a surface formed by rupture was examined with a scanning electron microscope (SEM). As a result, the crystals which had precipitated in the glass-ceramics were found to be fine crystal grains having a diameter of from 20 to 40 nm. The results of measurements are also shown in Table 1.

EXAMPLES 2 TO 40

Precursor glasses were produced in the same manner as in Example 1, except that the composition was changed for each Example as shown in Tables 1 to 6. Each precursor glass was heat-treated under the conditions shown in the Tables to obtain a glass-ceramics. From an X-ray powder diffraction pattern, the major crystalline phases in the glass-ceramics obtained in each Example was found to be constituted of crystals identified as galaxite, spessartite, rhodonite, tephroite, pyroxmangite, pyrophanite, and manganese cordierite. The X-ray diffraction pattern for each of the above crystalline substances had shifted from that for its pure form, showing that part of the cations constituting each crystal had been replaced with ions of other metals, e.g., titanium, magnesium, zinc, zirconium, and cerium. Furthermore, a platy sample and a columnar sample were produced in each Example and examined for density, elastic modulus, thermal expansion coefficient, transition temperature and yield point in the same manners as in Example 1. The results of the measurements are shown in Tables 1 to 6.

TABLE 1

| | Example | | | | | | |
|---|---|---|---|---|---|---|---|
| | 1 | 2 | 3 | 4 | 5 | 6 | 7 |
| $SiO_2$ (%) | 42.2 | 43.0 | 42.8 | 43.0 | 33.8 | 43.0 | 35.4 |
| $Al_2O_3$ (%) | 12.7 | 13.0 | 8.1 | 13.0 | 13.0 | 13.0 | 14.1 |
| MnO (%) | 35.3 | 16.0 | 21.7 | 21.0 | 43.5 | 26.0 | 16.2 |
| MgO (%) | 0.0 | 19.9 | 19.3 | 15.0 | 0.0 | 10.0 | 8.5 |
| $TiO_2$ (%) | 9.8 | 8.0 | 5.7 | 8.0 | 9.7 | 8.0 | 16.2 |
| $ZrO_2$ (%) | 0.0 | 0.0 | 2.4 | 0.0 | 0.0 | 0.0 | 3.1 |
| ZnO (%) | 0.0 | 0.0 | 0.0 | 0.0 | 0.0 | 0.0 | 3.6 |
| $CeO_2$ (%) | 0.0 | 0.0 | 0.0 | 0.0 | 0.0 | 0.0 | 2.8 |
| MnO + MgO + ZnO (%) | 35.3 | 35.9 | 41.0 | 36.0 | 43.5 | 36.0 | 28.3 |
| Color tone of precursor glass | black | black | Black | black | black | black | black |
| Density thereof (g/cm$^3$) | 3.22 | 3.01 | 3.17 | 3.07 | 3.43 | 3.12 | 3.38 |
| Modulus of elasticity thereof (GPa) | 100 | 109 | 109 | 106 | 106 | 105 | 121 |
| Coefficient of thermal expansion thereof (*1) | 53 | 54 | 58 | 52 | 60 | 53 | 59 |
| Glass transition point thereof (° C.) | 664 | 711 | 700 | 699 | 645 | 685 | 745 |
| Yield point thereof (° C.) | 710 | 762 | 753 | 753 | 690 | 746 | 787 |
| Liquidus temperature thereof (° C.) | 1090 | 1260 | 1230 | 1230 | 1230 | 1190 | 1310 |
| Heat treatment/first stage | | | | | | | |
| Temperature (° C.) | 750 | 750 | 750 | 750 | 700 | 750 | 800 |
| Time (h) | 4 | 3 | 3 | 3 | 4 | 3 | 2 |
| Heat treatment/second stage | | | | | | | |
| Temperature (° C.) | 850 | 900 | 900 | 900 | 800 | 900 | 950 |
| Time (h) | 4 | 4 | 4 | 4 | 4 | 4 | 4 |
| Color tone of crystallized glass | black | dark brown | dark brown | black-brown | black | black | brown |
| Density thereof (g/cm$^3$) | 3.52 | 3.37 | 3.52 | 3.43 | 3.81 | 3.49 | 3.50 |
| Modulus of elasticity thereof (GPa) | 130 | 158 | 153 | 152 | 144 | 143 | 143 |
| Coefficient of thermal expansion thereof (*1) | 74 | 82 | 97 | 89 | 90 | 94 | 63 |
| Expansion coefficient transition temperature thereof (*2) | 871 | >900 | >900 | >900 | 845 | >900 | >900 |
| Yield point thereof (° C.) | >900 (*3) | >900 | >900 | >900 | >900 | >900 | >900 |

(*1) Average coefficient of linear expansion at 50–350° C. (× 10$^{-7}$ ° C.$^{-1}$).
(*2) Inflection point in thermal expansion curve (temperature at which the coefficient of expansion increases abruptly) (° C.).
(*3) Higher than the determination limit.

TABLE 2

| | Example | | | | | | |
|---|---|---|---|---|---|---|---|
| | 8 | 9 | 10 | 11 | 12 | 13 | 14 |
| $SiO_2$ (%) | 40.8 | 42.8 | 35.7 | 35.4 | 42.8 | 37.8 | 43.0 |
| $Al_2O_3$ (%) | 7.8 | 8.1 | 12.8 | 9.1 | 8.1 | 12.6 | 13.0 |
| MnO (%) | 20.7 | 26.7 | 41.3 | 45.5 | 31.7 | 38.8 | 36.0 |
| MgO (%) | 18.4 | 14.3 | 0.0 | 0.0 | 9.3 | 0.0 | 0.0 |
| $TiO_2$ (%) | 5.4 | 5.7 | 10.2 | 10.1 | 5.7 | 10.8 | 8.0 |
| $ZrO_2$ (%) | 2.3 | 2.4 | 0.0 | 0.0 | 2.4 | 0.0 | 0.0 |
| ZnO (%) | 0.0 | 0.0 | 0.0 | 0.0 | 0.0 | 0.0 | 0.0 |
| $CeO_2$ (%) | 4.6 | 0.0 | 0.0 | 0.0 | 0.0 | 0.0 | 0.0 |
| MnO + MgO + ZnO (%) | 39.1 | 41.0 | 41.3 | 45.5 | 41.0 | 38.8 | 36.0 |
| Color tone of precursor glass | dark brown | black | Black | black | black | black | black |
| Density thereof (g/cm³) | 3.35 | 3.23 | 3.38 | 3.49 | 3.29 | 3.32 | 3.24 |
| Modulus of elasticity thereof (GPa) | 109 | 107 | 105 | 103 | 105 | 105 | 101 |
| Coefficient of thermal expansion thereof (*1) | 57 | 58 | 58 | 63 | 57 | 56 | 48 |
| Glass transition point thereof (° C.) | 701 | 687 | 650 | 636 | 671 | 653 | 664 |
| Yield point thereof (° C.) | 753 | 743 | 694 | 684 | 730 | 699 | 715 |
| Liquidus temperature thereof (° C.) | 1200 | 1200 | 1190 | 1190 | 1150 | 1150 | 1120 |
| Heat treatment/first stage | | | | | | | |
| Temperature (° C.) | 750 | 750 | 700 | 700 | 700 | 700 | 750 |
| Time (h) | 3 | 3 | 4 | 4 | 4 | 4 | 4 |
| Heat treatment/second stage | | | | | | | |
| Temperature (° C.) | 900 | 900 | 850 | 850 | 850 | 850 | 850 |
| Time (h) | 4 | 4 | 4 | 4 | 4 | 4 | 4 |
| Color tone of crystallized glass | dark brown | dark brown | Black | black | black | black | black |
| Density thereof (g/m³) | 3.61 | 3.57 | 3.74 | 3.81 | 3.60 | 3.64 | 3.58 |
| Modulus of elasticity thereof (GPa) | 142 | 142 | 142 | 139 | 139 | 136 | 135 |
| Coefficient of thermal expansion thereof (*1) | 93 | 101 | 81 | 96 | 96 | 78 | 70 |
| Expansion coefficient transition temperature thereof (*2) | >900 | >900 | 871 | 855 | >900 | 853 | 914 |
| Yield point thereof (° C.) | >900 | >900 | >900 | >900 | >900 | >900 | >915 |

(*1) Average coefficient of linear expansion at 50–350° C. (× $10^{-7}$ ° $C.^{-1}$).
(*2) Inflection point in thermal expansion curve (temperature at which the coefficient of expansion increases abruptly) (° C.).
(*3) Higher than the determination limit.

TABLE 3

| | Example | | | | | | |
|---|---|---|---|---|---|---|---|
| | 15 | 16 | 17 | 18 | 19 | 20 | 21 |
| $SiO_2$ (%) | 41.7 | 37.0 | 43.0 | 39.1 | 41.3 | 38.2 | 41.7 |
| $Al_2O_3$ (%) | 12.6 | 4.8 | 13.0 | 12.5 | 12.5 | 12.6 | 12.6 |
| MnO (%) | 34.9 | 47.6 | 31.0 | 37.2 | 34.6 | 38.3 | 34.9 |
| MgO (%) | 0.0 | 0.0 | 5.0 | 0.0 | 0.0 | 0.0 | 0.0 |
| $TiO_2$ (%) | 9.7 | 10.6 | 8.0 | 11.2 | 9.6 | 10.9 | 9.7 |
| $ZrO_2$ (%) | 0.0 | 0.0 | 0.0 | 0.0 | 0.0 | 0.0 | 1.0 |
| ZnO (%) | 0.0 | 0.0 | 0.0 | 0.0 | 0.0 | 0.0 | 0.0 |
| $CeO_2$ (%) | 1.0 | 0.0 | 0.0 | 0.0 | 2.0 | 0.0 | 0.0 |
| MnO + MgO + ZnO (%) | 34.9 | 47.6 | 36.0 | 37.2 | 34.6 | 38.3 | 34.9 |
| Color tone of precursor glass | black | black | Black | black | black | black | black |
| Density thereof (g/cm³) | 3.31 | 3.56 | 3.16 | 3.21 | 3.36 | 3.22 | 3.30 |
| Modulus of elasticity thereof (GPa) | 102 | 102 | 102 | 104 | 103 | 103 | 103 |
| Coefficient of thermal expansion thereof (*1) | 58 | 63 | 54 | 54 | 57 | 53 | 55 |
| Glass transition point thereof (° C.) | 654 | 627 | 677 | 680 | 652 | 677 | 674 |
| Yield point thereof (° C.) | 711 | 679 | 731 | 710 | 712 | 706 | 721 |
| Liquidus temperature thereof (° C.) | 1160 | 1150 | 1150 | 1190 | 1090 | 1190 | 1160 |
| Heat treatment/first stage | | | | | | | |
| Temperature (° C.) | 750 | 700 | 750 | 750 | 750 | 750 | 750 |
| Time (h) | 3 | 4 | 3 | 3 | 3 | 3 | 3 |
| Heat treatment/second stage | | | | | | | |
| Temperature (° C.) | 850 | 800 | 850 | 900 | 850 | 900 | 850 |
| Time (h) | 4 | 4 | 4 | 4 | 4 | 4 | 4 |
| Color tone of crystallized glass | black | black-dark brown | Black | dark brown | black | dark brown | black |
| Density thereof (g/cm³) | 3.64 | 3.84 | 3.51 | 3.49 | 3.68 | 3.51 | 3.61 |

TABLE 3-continued

| | Example | | | | | | |
|---|---|---|---|---|---|---|---|
| | 15 | 16 | 17 | 18 | 19 | 20 | 21 |
| Modulus of elasticity thereof (GPa) | 135 | 133 | 133 | 132 | 132 | 131 | 131 |
| Coefficient of thermal expansion thereof (*1) | — | 97 | 75 | 70 | 76 | 69 | 77 |
| Expansion coefficient transition temperature thereof (*2) | — | 870 | 864 | 766 | 883 | 877 | 871 |
| Yield point thereof (° C.) | — | >900 | >900 | >900 | >900 | >900 | >900 |

(*1) Average coefficient of linear expansion at 50–350° C. ($\times 10^{-7}$ °C.$^{-1}$).
(*2) Inflection point in thermal expansion curve (temperature at which the coefficient of expansion increases abruptly) (° C.).
(*3) Higher than the determination limit.

TABLE 4

| | Example | | | | | | |
|---|---|---|---|---|---|---|---|
| | 22 | 23 | 24 | 25 | 26 | 27 | 28 |
| $SiO_2$ (%) | 38.7 | 47.9 | 42.0 | 49.6 | 43.0 | 42.8 | 39.6 |
| $Al_2O_3$ (%) | 12.5 | 11.8 | 13.0 | 12.2 | 13.0 | 8.1 | 12.4 |
| MnO (%) | 37.8 | 9.3 | 35.0 | 17.9 | 34.0 | 32.7 | 36.7 |
| MgO (%) | 0.0 | 15.9 | 0.0 | 8.2 | 2.0 | 8.3 | 0.0 |
| $TiO_2$ (%) | 11.0 | 12.6 | 10.0 | 12.0 | 8.0 | 5.7 | 11.3 |
| $ZrO_2$ (%) | 0.0 | 2.5 | 0.0 | 0.0 | 0.0 | 2.4 | 0.0 |
| ZnO (%) | 0.0 | 0.0 | 0.0 | 0.0 | 0.0 | 0.0 | 0.0 |
| $CeO_2$ (%) | 0.0 | 0.0 | 0.0 | 0.0 | 0.0 | 0.0 | 0.0 |
| MnO + MgO + ZnO (%) | 37.8 | 25.2 | 35.0 | 26.1 | 36.0 | 41.0 | 36.7 |
| Color tone of precursor glass | black | black | Black | black | black | black | black |
| Density thereof (g/cm³) | 3.21 | 2.95 | 3.27 | 2.96 | 3.11 | 3.19 | 3.20 |
| Modulus of elasticity thereof (GPa) | 103 | 108 | 102 | 105 | 100 | 102 | 103 |
| Coefficient of thermal expansion thereof (*1) | 54 | 51 | 54 | 49 | 49 | 52 | 56 |
| Glass transition point thereof (° C.) | 677 | 755 | 653 | 730 | 676 | 680 | 679 |
| Yield point thereof (° C.) | 706 | 805 | 702 | 766 | 714 | 741 | 713 |
| Liquidus temperature thereof (° C.) | 1220 | 1260 | 1090 | 1230 | 1150 | 1150 | 1220 |
| Heat treatment/first stage | | | | | | | |
| Temperature (° C.) | 750 | 800 | 700 | 800 | 750 | 750 | 750 |
| Time (h) | 3 | 2 | 4 | 2 | 3 | 3 | 3 |
| Heat treatment/second stage | | | | | | | |
| Temperature (° C.) | 900 | 950 | 850 | 950 | 900 | 850 | 900 |
| Time (h) | 4 | 4 | 4 | 4 | 4 | 4 | 4 |
| Color tone of crystallized glass | dark brown | black-brown | Black | black | black | black | dark brown |
| Density thereof (g/cm³) | 3.50 | 3.59 | 3.58 | 3.23 | 3.42 | 3.46 | 3.47 |
| Modulus of elasticity thereof (GPa) | 130 | 130 | 130 | 130 | 129 | 128 | 128 |
| Coefficient of thermal expansion thereof (*1) | 70 | 96 | 80 | 91 | 68 | 89 | 69 |
| Expansion coefficient transition temperature thereof (*2) | 885 | >900 | >900 | >900 | 886 | >900 | 884 |
| Yield point thereof (° C.) | >900 | >900 | 832 | >900 | >900 | >900 | >900 |

(*1) Average coefficient of linear expansion at 50–350° C. ($\times 10^{-7}$ °C.$^{-1}$).
(*2) Inflection point in thermal expansion curve (temperature at which the coefficient of expansion increases abruptly) (° C.).
(*3) Higher than the determination limit.

TABLE 5

| | Example | | | | | | |
|---|---|---|---|---|---|---|---|
| | 29 | 30 | 31 | 32 | 33 | 34 | 35 |
| $SiO_2$ (%) | 42.8 | 42.8 | 40.5 | 40.1 | 43.9 | 43.0 | 42.3 |
| $Al_2O_3$ (%) | 8.1 | 8.1 | 12.3 | 12.4 | 13.3 | 13.0 | 13.0 |
| MnO (%) | 33.7 | 34.7 | 33.9 | 36.1 | 36.7 | 33.0 | 32.6 |
| MgO (%) | 7.3 | 6.3 | 0.0 | 0.0 | 0.0 | 3.0 | 0.0 |
| $TiO_2$ (%) | 5.7 | 5.7 | 13.3 | 11.4 | 6.1 | 8.0 | 12.1 |
| $ZrO_2$ (%) | 2.4 | 2.4 | 0.0 | 0.0 | 0.0 | 0.0 | 0.0 |
| ZnO (%) | 0.0 | 0.0 | 0.0 | 0.0 | 0.0 | 0.0 | 0.0 |
| $CeO_2$ (%) | 0.0 | 0.0 | 0.0 | 0.0 | 0.0 | 0.0 | 0.0 |
| MnO + MgO + ZnO (%) | 41.0 | 41.0 | 33.9 | 36.1 | 36.7 | 36.0 | 32.6 |
| Color tone of precursor glass | black | black | Black | black | black | black | black |
| Density thereof (g/cm³) | 3.20 | 3.21 | 3.18 | 3.27 | — | 3.10 | 3.19 |

TABLE 5-continued

|  | Example |  |  |  |  |  |  |
|---|---|---|---|---|---|---|---|
|  | 29 | 30 | 31 | 32 | 33 | 34 | 35 |
| Modulus of elasticity thereof (GPa) | 103 | 102 | 106 | 103 | — | 101 | 102 |
| Coefficient of thermal expansion thereof (*1) | 55 | 54 | 50 | 55 | 50 | 50 | 52 |
| Glass transition point thereof (° C.) | 676 | 676 | 714 | 660 | 669 | 676 | 683 |
| Yield point thereof (° C.) | 740 | 736 | 770 | 708 | 722 | 717 | 724 |
| Liquidus temperature thereof (° C.) | 1150 | 1120 | 1220 | 1150 | 1090 | 1150 | 1200 |
| Heat treatment/first stage |  |  |  |  |  |  |  |
| Temperature (° C.) | 750 | 750 | 750 | 700 | 700 | 750 | 750 |
| Time (h) | 3 | 3 | 3 | 4 | 4 | 3 | 3 |
| Heat treatment/second stage |  |  |  |  |  |  |  |
| Temperature (° C.) | 900 | 900 | 900 | 850 | 850 | 900 | 850 |
| Time (h) | 4 | 4 | 4 | 4 | 4 | 4 | 4 |
| Color tone of crystallized glass | black | black | Light Brown | black | dark brown | black | black |
| Density thereof (g/cm³) | 3.50 | 3.52 | 3.38 | 3.48 | 3.53 | 3.41 | 3.43 |
| Modulus of elasticity thereof (GPa) | 128 | 127 | 127 | 127 | 126 | 126 | 126 |
| Coefficient of thermal expansion thereof (*1) | 92 | 90 | — | — | — | 68 | — |
| Expansion coefficient transition temperature thereof (*2) | >900 | >900 | — | — | — | 882 | — |
| Yield point thereof (° C.) | >900 | >900 | — | — | — | >900 | — |

(*1) Average coefficient of linear expansion at 50–350° C. (× $10^{-7}$ ° $C.^{-1}$).
(*2) Inflection point in thermal expansion curve (temperature at which the coefficient of expansion increases abruptly) (° C.).
(*3) Higher than the determination limit.

TABLE 6

|  | Example |  |  |  |  |
|---|---|---|---|---|---|
|  | 36 | 37 | 38 | 39 | 40 |
| $SiO_2$ (%) | 43.0 | 43.8 | 43.0 | 43.0 | 35.0 |
| $Al_2O_3$ (%) | 13.0 | 8.3 | 13.0 | 13.0 | 10.0 |
| MnO (%) | 32.0 | 22.2 | 26.0 | 31.0 | 42.0 |
| MgO (%) | 4.0 | 19.8 | 0.0 | 0.0 | 0.0 |
| $TiO_2$ (%) | 8.0 | 5.8 | 8.0 | 8.0 | 7.0 |
| $ZrO_2$ (%) | 0.0 | 0.0 | 0.0 | 0.0 | 4.0 |
| ZnO (%) | 0.0 | 0.0 | 10.0 | 5.0 | 2.0 |
| $CeO_2$ (%) | 0.0 | 0.0 | 0.0 | 0.0 | 0.0 |
| MnO + MgO + ZnO (%) | 36.0 | 42.0 | 36.0 | 36.0 | 44.0 |
| Color tone of precursor glass | black | black | Black | black | black |
| Density thereof (g/cm³) | 3.09 | 3.10 | 3.28 | 3.24 | 3.54 |
| Modulus of elasticity therefore (GPa) | 101 | 107 | 103 | 101 | 108 |
| Coefficient of thermal expansion thereof (*1) | 51 | 61 | 49 | 51 | 61 |
| Glass transition point thereof (° C.) | 680 | 693 | 653 | 657 | 655 |
| Yield point thereof (° C.) | 719 | 744 | 696 | 704 | 705 |
| Liquidus temperature thereof (° C.) | 1150 | 1230 | 1310 | 1260 | 1290 |
| Heat treatment/first stage |  |  |  |  |  |
| Temperature (° C.) | 750 | 750 | 700 | 700 | 700 |
| Time (h) | 3 | 3 | 4 | 4 | 4 |
| Heat treatment/second stage |  |  |  |  |  |
| Temperature (° C.) | 900 | 900 | 800 | 850 | 850 |
| Time (h) | 4 | 4 | 4 | 4 | 4 |
| Color tone of crystallized glass | black | black | Black | dark brown | dark brown |
| Density thereof (g/cm³) | 3.43 | 3.31 | 3.46 | 3.45 | 3.67 |
| Modulus of elasticity thereof (GPa) | 126 | 126 | 123 | 122 | 122 |
| Coefficient of thermal expansion thereof (*1) | — | — | — | — | — |
| Expansion coefficient transition temperature thereof (*2) | — | — | — | — | — |
| Yield point thereof (° C.) | — | — | — | — | — |

(*1) Average coefficient of linear expansion at 50–350° C. (× $10^{-7}$ ° $C.^{-1}$).
(*2) Inflection point in thermal expansion curve (temperature at which the coefficient of expansion increases abruptly) (° C.).
(*3) Higher than the determination limit.

Production of Crystallized Substrates and Performance Evaluation

Each of the glass-ceramics produced in the Examples was cut into a disk form having a thickness of 1.1 mm, an outer diameter of 95 mm, and an inner diameter of a hole of 25 mm. The inner and outer circumferential surfaces were subjected to chamfering and edge polishing. Subsequently, both sides of the disk were roughly polished with free abrasive particles (main component: $CeO_2$) having an average particle diameter of 1 μm, and both surfaces of the disk were then precisely polished with free abrasive particles (main component: $CeO_2$) whose average particle diameter is about 0.6 μm until the thickness of the disk reached 0.8 mm. For this polishing, a conventional method and a conventional apparatus were used. In the manner described above, crystallized substrates were obtained. After that, a surface of the crystallized substrate was observed with an atomic force microscope (AFM). As a result, the surface roughness Ra thereof was about 0.3 nm. The polishing waste coming from the polishing process was used as part of the raw materials in Examples 7, 8, 15, and 19.

Subsequently, the crystallized substrates were examined for performances in the case of use as substrates. These crystallized substrates were black and free from the scattering of reflected light caused by crystal grains. Hence, they were easy to examine for surface defects. As a result of the examination for defects, no mars or adherent substances were observed on the surface.

On each of these crystallized substrates were successively deposited chromium (Cr) as an undercoat layer, cobalt (Co)-chromium (Cr)-tantalum (Ta) as a recording layer, and carbon (C) as a protective layer in this order by vacuum sputtering process. On this protective layer, a lubricating layer comprising an organic solvent was formed. In this manner, magnetic recording media were produced from crystallized substrates. Each of the magnetic recording medium was set in a closed type hard-disk drive in a conventional manner, and this drive was continuously operated at each of 10,000 rpm and 12,000 rpm for 10 hours for each speed. As a result, the substrates were free from problems such as head crushing.

Comparative Examples 1 and 2

Batches were prepared so as to result in the compositions shown in Table 7, and sample glasses were produced therefrom in the same manner as in Example 1. As a result, the molten glass of Comparative Example 1 was devitrified and the molten glass of Comparative Example 2 became muddy by phase separation during the cooling process. Therefore, it was failed to obtain a homogenous precursor glasses. Consequently, the subsequent evaluations were omitted.

Comparative Example 3

A batch was prepared so as to result in the composition shown in Table 7, and it was attempted to melt the batch in the same manner as in Example 1. However, the batch was turned into a hard lump and no liquid portion was found. The batch was hence heated up to 1,700° C. As a result, the batch mostly melted but partly remained unmelted. Thus, a homogenous precursor glass was not obtained and the subsequent evaluations were hence omitted.

Comparative Example 4

Comparative Example 4 is as disclosed in U.S. Pat. No. 5,476,821.

A batch was prepared so as to result in the composition shown in Table 7, and a sample glass was produced therefrom in the same manner as in Example 1. This sample glass was held in an electric furnace set at 800° C. for 4 hours. Thereafter, the electric furnace was heated to 975° C. to crystallize the specimen sufficiently. The glass-ceramics thus obtained was examined for properties in the same methods as in Example 1. This glass-ceramics was white and was hence unable to be evaluated for surface defects such as mars and foreign substances.

Comparative Examples 5 and 6

Batches were prepared so as to result in the compositions shown in Table 7, and sample glasses were produced therefrom in the same manner as in Example 1. These sample glasses were held in an electric furnace set at 850° C. for 4 hours. Thereafter, the electric furnace was heated to 1,200° C. to crystallize the specimens sufficiently. The glass-ceramics thus obtained were examined for properties in the same methods as in Example 1. These glass-ceramics are disclosed in JP-A-8-91873. Elastic modulus was as low as 103 GPa in Comparative Example 6, and although surfaces of these specimens were roughly and precisely polished in a same manner described in "Production of Crystallized Substrates and Performance Evaluation", their surfaces were so rough that a surface roughness Ra was 2.4 nm.

Comparative Example 7

A soda-lime glass whose composition is shown in Table 7 was evaluated as a reference. This soda-lime glass was obtained by sampling a commercial float glass. This soda-lime glass was subjected to the same property measurements as in Example 1 without being crystallized. This glass was transparent and easy to evaluate for defects, however, its elastic modulus was as low as 72 GPa.

TABLE 7

| | Comparative Example | | | | | | |
|---|---|---|---|---|---|---|---|
| | 1 | 2 | 3 | 4 | 5 | 6 | 7 |
| $SiO_2$ (%) | 36.9 | 37.0 | 76.0 | 44.2 | 59.3 | 58.8 | 71.6 |
| $Al_2O_3$ (%) | 0 | 14.0 | 7.0 | 26.8 | 16.2 | 14.9 | 0.9 |
| MnO (%) | 57.0 | 32.0 | 14.0 | 0 | 0 | 0 | 0 |
| MgO (%) | 0 | 0 | 3.0 | 12.5 | 13.1 | 9.1 | 6.0 |
| $TiO_2$ (%) | 6.1 | 5.0 | 0 | 11.6 | 0 | 0 | 0 |
| $ZrO_2$ (%) | 0 | 12.0 | 0 | 0 | 0 | 0 | 0 |
| ZnO (%) | 0 | 0 | 0 | 4.4 | 0 | 0 | 8.4 |
| $CeO_2$ (%) | 0 | 0 | 0 | 0 | 0 | 0 | 0 |
| $Na_2O$ (%) | 0 | 0 | 0 | 0 | 0 | 0 | 12.7 |
| $K_2O$ (%) | 0 | 0 | 0 | 0 | 0 | 0 | 0.5 |
| NiO (%) | 0 | 0 | 0 | 0 | 11.5 | 17.1 | 0 |
| Other ingredients | 0 | 0 | 0 | 0.5 | 0 | 0 | 0 |
| MnO + MgO + ZnO (%) | 57.0 | 32.0 | 17.0 | 16.9 | 13.1 | 9.1 | 14.4 |
| Features of Precursor Glass | devitrified black glass | phase-separated light-brown glass | light-brown glass containing unmelted residue | — | — | — | transparent glass with density of 2.5 and modulus of 72 |
| Heat treatment/first stage | | | | | | | |
| Temperature (° C.) | — | — | — | 800 | 850 | 850 | — |
| Time (h) | — | — | — | 2 | 4 | 4 | — |

TABLE 7-continued

| | Comparative Example | | | | | | |
|---|---|---|---|---|---|---|---|
| | 1 | 2 | 3 | 4 | 5 | 6 | 7 |
| Heat treatment/second stage | | | | | | | |
| Temperature (° C.) | — | — | — | 975 | 1200 | 1200 | — |
| Time (h) | — | — | — | 4 | 4 | 4 | — |
| Color tone of Crystallized Glass | — | — | — | white | blue-green | blue-green | — |
| Modulus of Elasticity thereof (GPa) | — | — | — | 128 | — | 103 | — |
| Surface Roughness, Ra (nm) | — | — | — | — | 2.4 | — | — |
| Specific gravity (g/cm$^3$) | — | — | — | 2.95 | — | 3.04 | — |

From the Examples and Comparative Examples given above, the following can be seen.

The glass-ceramics of Examples 1 to 40 have excellent properties such -as an exceedingly high elastic modulus, a moderate density and a liquidus temperature suitable for industrial production. For example, the glass-ceramics of Example 2 has an elastic modulus of 158 GPa, which is at least two times higher than the elastic modulus of the conventional aluminum alloy (71 GPa). The glass-ceramics of the Examples are effectively utilizable as crystallized substrates to take advantage of these properties.

In Example 1, a glass-ceramics having an elastic modulus as high as 130 GPa is easily produced because the precursor glass has a liquidus temperature as low as 1,090° C.

Of the glass-ceramics obtained above, those each having an elastic modulus of at least 130 GPa ranged in density from a minimum of 3.23 g·cm$^{-3}$ for Example 25 to a maximum of 3.84 g·cm$^{-3}$ for Example 16. Consequently, the glass-ceramics according to the present invention can be controlled so as to have any density in a wide range while having a high elastic modulus.

With respect to the thermal expansion coefficient, it ranges from a minimum of $63 \times 10^{-7}$ ° C.$^{-1}$ for Example 7 to a maximum of $101 \times 10^{-7}$ ° C.$^{-1}$ for Example 9. Consequently, the glass-ceramics according to the present invention can be controlled to any value of thermal expansion coefficient in a wide range.

In many cases, a rotating shaft of a hard-disk drive, it is called as a spindle, is made of stainless steel. Since the thermal expansion coefficient of stainless steel is about $100 \times 10^{-1}$ ° C.$^{-1}$, it is preferable that thermal expansion coefficient of substrates is from $70 \times 10^{-7}$ to $100 \times 10^{-7}$ ° C.$^{-1}$ in order to avoid various troubles arising from differences in thermal expansion coefficient between substrates and the spindle. The glass-ceramics of the Examples can easily cover that range, and can easily cope with a desire for substrates having an even lower thermal expansion coefficient. For fixing substrates to the spindle, a ring made of stainless steel is generally used. This ring is called a spacer. However, spacers made of glass or glass ceramics are more preferable than those of stainless steel. In particular, when the substrate is made of glass or glass ceramics, it is preferred to use spacers made of material of the same composition. It is because surface of glass or glass-ceramics spacers can be smoother than that of stainless steel spacers and there is less tendency to generate debris when spacers contact with the substrate or the spindle. Such debris adhere to the medium surface to cause head crushing. The danger of this head crushing can be reduced by employing a spacer made of glass or glass ceramics. Furthermore, use of spacers of the same composition as the substrate is effective to prevent the shift in contact position between spacers and spindle, because thermal expansion coefficient of the spacer and the substrate is identical. Since an internal temperature of hard disks can go up to 100° C. or higher, even a slight difference in thermal expansion coefficient between a substrate and spacers can result in such a shift. If the substrate/spacer contact position moves, the rotational orbit of the substrate is deformed and this deformation causes vibration of substrate. Consequently, spacers made of the glass-ceramics according to the present invention can be employed as a higher-quality substitute for stainless-steel spacers. When crystallized substrates are used, it is preferable to use glass-ceramics spacers of same composition as the substrate.

The elastic modulus of glass-ceramics shown as the Examples is over 120 GPa, and many of these had an elastic modulus of 130 GPa or higher. The maximum among these was 158 GPa, which was at least two times higher than that of aluminum alloy and that of soda-lime glasses shown in Comparative Example 7.

The present invention can be practiced also as the following embodiments.

(a) A glass-ceramics which comprises, in terms of mol %, 30 to 75% silicon dioxide ($SiO_2$), 4 to 33% aluminum oxide ($Al_2O_3$), 8 to 55% manganese oxide (MnO), 0 to 20% magnesium oxide (MgO), 0 to 20% zinc oxide (ZnO), 0 to 20% titanium dioxide ($TiO_2$), 0 to 10% zirconium oxide ($ZrO_2$), 0 to 5% cerium oxide ($CeO_2$) and 0 to 8% other ingredient(s), and which has major crystalline phases constituted of crystals containing manganese (Mn).

(b) A glass-ceramics having major crystalline phases which are constituted of crystals containing manganese (Mn) and further containing both at least one element selected from aluminum (Al), silicon (Si) and titanium (Ti) and at least one element selected from magnesium (Mg), zinc (Zn), zirconium (Zr) and cerium (Ce), and which has a Mohs' hardness of 6 or higher.

(c) A glass-ceramics ring which is used for corotatably connecting a crystallized substrate having major crystalline phases constituted of crystals containing manganese (Mn) to a rotating spindle shaft, and which consists of the same components as the crystallized substrate.

Because the present invention has the constitutions described above, it produces the following effects.

1) An inexpensive glass-ceramics of high elastic modulus can be easily produced because the major crystalline phases contained therein are constituted of crystals containing manganese (Mn).

2) A glass-ceramics of elastic modulus of 110 GPa or higher without fail and of a liquidus temperature of about 1,260° C. or lower can be easily obtained, in addition to the effect of the invention described in item 1, because the crystals constituting the major crystalline phases c) above contain at least one element selected from aluminum (Al), silicon (Si), and titanium (Ti) and these major crystalline phases have a Mohs' hardness of 6 or higher.

3) A glass-ceramics of higher elastic modulus and highly homogeneous can be obtained, in addition to the effect of the invention described in item 1) or 2) above, because the crystals constituting the major crystalline phase contain at least one element selected from magnesium (Mg) zinc (Zn), zirconium (Zr), and cerium (Ce).

4) Homogeneity of precursor glass is enhanced and the major crystalline phase in the glass-ceramics tends to contain manganese, because the glass contains manganese in an amount of from 8 to 55% in terms of manganese oxide (MnO).

5) An inexpensive glass-ceramics of high elastic modulus can be easily produced because it has a preferred composition.

6) An inexpensive glass-ceramics of high elastic modulus can be easily produced more surely because it has a more preferred composition.

7) An inexpensive glass-ceramics of higher elastic modulus can be easily produced most surely because it has a most preferred composition.

8) A glass-ceramics of much higher elastic modulus can be obtained from a precursor glass of low liquidus temperature, in addition to the effect of the invention described in any one of items 5) to 7) above, because the glass contains bivalent metal oxides RO (MnO+MgO+ZnO) in an amount of from 25 to 50%.

9) A glass-ceramics which has high performances and high durability in various applications is obtained, in addition to the effect of the invention described in any one of items 1) to 8) above, because it has an elastic modulus of 110 GPa or higher.

10) Mass production by float process is possible, in addition to the effect of the invention described in any one of items 1) to 9) above, because the glass-ceramics is produced from a precursor glass of liquidus temperature of 1,260° C. or lower and is hence less apt to devitrificate.

11) Effective utilization of resources by recycling and environmental protection by the reduction of the discharge amount of an industrial waste can be attained, because waste from grinding or polishing process is used as a part of raw material.

12) A glass-ceramics of high elastic modulus and containing a large amount of exceedingly fine crystals precipitated therein is easily obtained because a two-stage heat treatment for crystallization is conducted under specific conditions.

13) A crystallized substrate of high surface smoothness and highly resistable to bend even in high speed rotation is obtained without fail because the glass-ceramics described in any one of items 1) to 10) above is used.

14) A further increase in information recording density is attained because the crystallized substrate described in item 13) above is used.

15) An information recording device which can be operated at a lower flying height, can have a higher information recording density and a high rate of information recording/reproducing, and has high durability is obtained without fail because the information recording medium of item 14) above is integrated.

What we claim is:

1. A glass-ceramic whose major crystalline phases are constituted of crystals containing manganese (Mn), wherein the glass-ceramic comprises, in terms of mol %:
    33 to 55% silicon dioxide ($SiO_2$),
    5 to 15% aluminum oxide ($Al_2O_3$),
    9 to 50% manganese oxide (MnO),
    0 to 20% magnesium oxide (MgO),
    0 to 10% zinc oxide (ZnO),
    4 to 15% titanium oxide ($TiO_2$),
    0 to 5% zirconium oxide ($ZrO_2$),
    0 to 5% cerium oxide ($CeO_2$), and
    0 to 8% other ingredient(s),
and the total content of the bivalent-metal oxides RO (MnO+MgO+ZnO) is from 25 to 50 mol %.

2. The glass-ceramic as claimed in claim 1, wherein the crystals contain at least one element selected from the group consisting of aluminum (Al), silicon (Si) and titanium (Ti), and the major crystalline phases comprising the crystals whose Mohs' hardness is 6 or higher.

3. The glass-ceramic of claim 1 or 2, wherein the crystals contain at least one element selected from the group consisting of magnesium (Mg), zinc (Zn), zirconium (Zr) and cerium (Ce).

4. The glass-ceramic of any one of claims 1–2, whose elastic modulus as represented by Young's modulus is 110 GPa or higher.

5. The glass-ceramic of any one of claims 1–2, which is obtained from a precursor glass whose liquidus temperature is 1,260° C. or lower.

6. A process for producing a glass-ceramic from raw material, wherein a part of the raw material for producing the glass-ceramic comprises waste produced from grinding or polishing a glass-ceramic, or a precursor thereof, of any one of claims 1–2.

7. A process for producing the glass-ceramic of any one of claims 1–2, which comprises the process in which a precursor glass is kept at a certain temperature for a certain period of time (first-stage heat treatment) and then the precursor glass is kept at a temperature higher than that of the first-stage heat treatment for a certain period of time (second-stage heat treatment),
    the temperature of first-stage heat treatment is from 25 to 100° C. higher than the glass transition temperature ($T_g$) of the precursor glass for a period of time of 30 minutes or longer, and
    the temperature of second-stage heat treatment is from 75 to 300° C. higher than the glass transition temperature ($T_g$) of the precursor glass for a time period of 10 minutes or longer.

8. A substrate for information recording media, which comprises the glass-ceramic of any one of claims 1–2.

9. An information recording medium employing the substrate for information recording media of claim 8.

10. An information recording device containing the information recording medium of claim 9 integrated thereinto.

* * * * *